(12) United States Patent
Klostermann et al.

(10) Patent No.: US 12,539,836 B2
(45) Date of Patent: Feb. 3, 2026

(54) COMPRESSED-AIR BRAKING SYSTEM FOR A TRACTOR VEHICLE

(71) Applicant: ZF CV Systems Europe BV, Brussels (BE)

(72) Inventors: Thilo Klostermann, Barsinghausen (DE); Florian Schwagmeyer, Uetze-Dollbergen (DE)

(73) Assignee: ZF CV Systems Europe BV, Brussels (BE)

( * ) Notice: Subject to any disclaimer, the term of this patent is extended or adjusted under 35 U.S.C. 154(b) by 381 days.

(21) Appl. No.: 18/328,060

(22) Filed: Jun. 2, 2023

(65) Prior Publication Data

US 2023/0303045 A1   Sep. 28, 2023

Related U.S. Application Data

(63) Continuation of application No. PCT/EP2021/083278, filed on Nov. 29, 2021.

(30) Foreign Application Priority Data

Dec. 9, 2020 (DE) .................... 10 2020 132 722.6

(51) Int. Cl.
*B60T 13/36* (2006.01)
*B60T 8/17* (2006.01)
(Continued)

(52) U.S. Cl.
CPC ............ *B60T 13/36* (2013.01); *B60T 8/1708* (2013.01); *B60T 8/3605* (2013.01); *B60T 13/683* (2013.01)

(58) Field of Classification Search
CPC ...................................................... B60T 13/36
See application file for complete search history.

(56) References Cited

U.S. PATENT DOCUMENTS

2010/0187902 A1   7/2010   Bensch et al.
2011/0303501 A1   12/2011  Hilberer et al.
(Continued)

FOREIGN PATENT DOCUMENTS

CN    105377649 A    3/2016
CN    109383478 A    2/2019
(Continued)

OTHER PUBLICATIONS

English translation and International Preliminary Report on Patentability of The International Bureau of WIPO dated Jun. 13, 2023 for international application PCT/EP2021/083278 on which this application is based.

(Continued)

*Primary Examiner* — Melody M Burch
(74) *Attorney, Agent, or Firm* — Walter Ottesen, P.A.

(57) ABSTRACT

A compressed-air braking system of a tractor vehicle includes two service-brake circuits and a parking-brake circuit. A trailer control valve has a control input connected to a brake control line connected to a brake line of one of the service-brake circuits and an inverted control input connected to a further brake control line routed to a brake line of the parking-brake circuit. A valve device for braking a coupled trailer vehicle independently of the foot-brake valve has an electronically controllable valve unit arranged in the further brake control line routed to the inverted control input of the trailer control valve. Via the valve unit, the portion of the further brake control line on the trailer control-valve side can be connected alternately to the portion on the parking-brake valve side or to a depressurizing output.

4 Claims, 3 Drawing Sheets

(51) Int. Cl.
B60T 8/36 (2006.01)
B60T 13/68 (2006.01)

(56) References Cited

U.S. PATENT DOCUMENTS

| | | | |
|---|---|---|---|
| 2013/0184957 A1* | 7/2013 | Herges | B60T 13/686 |
| | | | 701/79 |
| 2013/0214588 A1 | 8/2013 | Kiel et al. | |
| 2018/0304871 A1 | 10/2018 | Eckert et al. | |
| 2022/0126805 A1 | 4/2022 | Kloos | |

FOREIGN PATENT DOCUMENTS

| | | | |
|---|---|---|---|
| DE | 10 2006 054 433 A1 | 5/2008 | |
| DE | 10 2007 042 316 A1 | 5/2008 | |
| DE | 10 2007 008 504 A1 | 8/2008 | |
| DE | 10 2008 047 632 A1 | 3/2010 | |
| DE | 10 2008 048 207 A1 | 6/2010 | |
| DE | 10 2010 050 580 A1 | 5/2012 | |
| DE | 10 2015 015 922 A1 | 6/2017 | |
| DE | 10 2019 103 661 A1 | 8/2020 | |
| EP | 1953054 A1 * | 8/2008 | ............ B60T 13/683 |
| GB | 2153467 A * | 8/1985 | ................ B60T 8/46 |
| JP | H9-58447 A | 3/1997 | |

OTHER PUBLICATIONS

English translation and Written Opinion of the International Searching Authority dated Mar. 22, 2022 for international application PCT/EP2021/083278 on which this application is based.

International Search Report of the European Patent Office dated Mar. 22, 2022 for international application PCT/EP2021/083278 on which this application is based.

English translation and First Office Action of the Chinese Patent Office dated Jul. 24, 2025 in corresponding Chinese patent application No. 202180081324.0.

\* cited by examiner

COMPRESSED-AIR BRAKING SYSTEM FOR A TRACTOR VEHICLE

CROSS-REFERENCE TO RELATED APPLICATIONS

This application is a continuation application of international patent application PCT/EP2021/083278, filed Nov. 29, 2021, designating the United States and claiming priority from German application 10 2020 132 722.6, filed Dec. 9, 2020, and the entire content of both applications is incorporated herein by reference.

BACKGROUND

In normal braking operation, a vehicle combination composed of a tractor vehicle, such as a truck or a semitrailer tractor, and a trailer vehicle, such as a drawbar trailer or a semitrailer, is usually braked by actuation of a foot-brake valve in the tractor vehicle. Via the foot-brake valve, a suitable braking pressure is produced in two service-brake circuits, each from a supply pressure of an assigned compressed-air accumulator that is applied on the input side, and is directed into an axle-brake line that leads, via wheel-brake lines, into the wheel-brake cylinders of the front or rear axle of the tractor vehicle. The braking of the trailer vehicle is effected in that the brake pressure at least at one of the brake lines of the front axle or rear axle of the tractor vehicle is tapped via a brake control line and directed to a direct control input of the trailer control valve. In the trailer control valve, a brake control pressure is produced in dependence on this brake pressure acting as control pressure, and is routed via a brake control output to a "brake" (yellow) gladhand coupler. This brake control pressure is converted, in a trailer brake valve of the trailer vehicle, into a brake pressure for the wheel brakes there.

When a vehicle combination is driving on a slope or on a road that is slippery due to a dirty, wet or icy road surface, the trailer vehicle may briefly be travelling at a higher speed than the tractor vehicle, which can often result in the vehicle combination jackknifing around the trailer hitch or drawbar axle or around the fifth-wheel coupling. In order to avoid such jackknifing, anti-jackknife braking of the trailer vehicle is usually performed, in which the vehicle combination is pulled straight by an actuation of the wheel brakes of the trailer vehicle that is independent of the foot-brake valve.

If the trailer vehicle is to be braked independently of the foot-brake valve, that is, without actuation of the foot-brake valve, there are basically two ways of doing this. On the one hand, the trailer vehicle may be braked by directing a brake control pressure of greater or lesser magnitude, via a brake control line and a valve device having at least one electronically controllable valve unit arranged in the brake control line, to one of the usually two direct control inputs of the trailer control valve. In addition, the trailer vehicle may also be braked in that a brake control line that leads to an inverted control input of the trailer control valve and that is pressurized during travel and with the parking brake disengaged, is depressurized to a greater or lesser extent via a valve device having at least one electronically controllable valve unit arranged in the brake control line.

DE 10 2015 015 922 A1 describes a compressed-air braking system of a tractor vehicle in which a brake control line is routed, via a switchover valve realized as a 3/2-way solenoid valve, from the compressed-air accumulator of a parking-brake circuit to a first input of a shuttle valve. A brake control line branching off from the axle-brake line of the rear axle is connected to the other input of this shuttle valve. From the output of this shuttle valve, a brake control line is routed to one of the two direct control inputs of a trailer control valve. Arranged in this brake control line there is a valve unit, which includes an inlet valve, realized as a 2/2-way solenoid valve, and an outlet valve, realized as a 2/2-way solenoid valve. As a result of the switchover valve being energized, the supply pressure of the compressed-air accumulator is directed, via the shuttle valve, into the brake control line leading to the trailer control valve. Via the valve unit arranged in this line, the brake control pressure applied to the respective control input can be modulated.

Known from DE 10 2006 054 433 A1 are four embodiments of an anti-jackknife braking means in a compressed-air braking system of a tractor vehicle, in which a brake control line provided with a valve device is routed from the compressed-air accumulator of a parking-brake circuit to the inverted control input of a trailer control valve. In a first embodiment according to FIG. 1 therein, the valve device includes a valve unit realized as a 3/2-way solenoid valve. In a second embodiment according to FIG. 2 therein, the valve device also includes, in addition to the valve unit just mentioned, an unloading valve connected downstream thereof and realized as a 2/2-way solenoid valve. In a third embodiment according to FIG. 3 therein, the valve device includes an electrically controllable solenoid relay valve. In the fourth embodiment according to FIG. 4 therein, the valve device includes a pressure-controlled relay valve and, assigned to it, a pilot valve realized as a 3/2-way solenoid valve. The brake control pressure applied to the inverted control input of the trailer control valve can be adjusted via the respective valve device.

DE 10 2008 048 207 C5 shows and describes a compressed-air braking system of a tractor vehicle, in which a brake control line provided with a valve device branches off from a compressed-air accumulator of a parking-brake circuit and is routed, on the one hand, to the control input of a pressure-controlled relay valve and, on the other hand, to the inverted control input of a trailer control valve. The valve device includes a valve unit realized as a 3/2-way solenoid valve and, downstream of it, a shut-off valve realized as a 2/2-way solenoid valve. The relay valve is arranged between a supply line connected to the compressed-air accumulator and an axle-brake line leading to the spring-brake cylinders of a vehicle axle. A further shut-off valve, realized as a 2/2-way solenoid valve, is connected upstream of the control input of the relay valve. The valve device serves both to adjust the brake control pressure applied to the control input of the relay valve and to adjust the brake control pressure applied to the inverted control input of the trailer control valve. To actuate the wheel brakes of the trailer vehicle in an anti-jackknife braking function, it is first necessary to switch over the shut-off valve assigned to the relay valve to its closed position and to switch over the shut-off valve of the valve device to its open position. The adjustment, or modulation, of the brake control pressure applied to the inverted control input of the trailer control valve by a greater or lesser degree of depressurization is then effected via the valve unit.

SUMMARY

In view of the sometimes rather elaborate structure and the relatively complicated controllability of the aforementioned valve device of compressed-air braking systems, it is an object of the disclosure to provide a compressed-air braking system that has a simply constructed and easily controllable valve device, by which an anti-jackknife braking function that is independent of the foot-brake valve can be performed for the purpose of braking a trailer vehicle coupled to a tractor vehicle.

This object is achieved by various compressed-air braking systems according to the disclosure.

Accordingly, the disclosure relates to a compressed-air braking system of a tractor vehicle, including two service-brake circuits, which each have a compressed-air accumulator, a supply line routed from the respective compressed-air accumulator to a foot-brake valve, and an axle-brake line routed from the foot-brake valve to wheel-brake lines and wheel-brake cylinders of a respective vehicle axle that are connected thereto, and including a parking-brake circuit, which has a third compressed-air accumulator, a supply line routed from the third compressed-air accumulator to a parking-brake valve, as well as an axle-brake line that leads from the parking-brake valve to wheel-brake lines and spring-brake cylinders of a vehicle axle that are connected thereto, and including a trailer control valve that has at least one direct control input and an inverted control input, wherein a brake control line connected to a brake line of one of the two service-brake circuits is connected to the at least one direct control input, and in which a brake control line connected to a brake line of the parking-brake circuit is connected to the inverted control input, and including a valve device for controlling braking of a coupled trailer vehicle independently of the foot-brake valve.

To achieve the above object, it is provided in the case of this compressed-air braking system that the valve device has an electronically controllable valve unit, that this valve unit is arranged in the brake control line connected to the inverted control input of the trailer control valve, that the valve unit has an input, that a portion of the brake control line on the parking-brake valve side is connected to this input, that the valve unit has an output, that the portion of the brake control line on the trailer control-valve side is connected to this output, that the valve unit has a depressurizing output, and that the portion of the brake control line on the trailer control-valve side can be connected, via the valve unit, alternately to the portion on the parking-brake valve side or to the depressurizing output.

Since the valve device has an electronically controllable valve unit that is arranged in the aforementioned manner in the brake control line routed to the inverted control input of the trailer control valve, the trailer vehicle can be braked easily and without impairment of the function of the service-brake circuits of the tractor vehicle, independently of the foot brake valve. This is achieved in that the portion of the brake control line on the trailer control-valve side is connected to the depressurizing output via the valve unit, thereby depressurizing the inverted control input of the trailer control valve.

According to a development of the compressed-air braking system described, it may be provided that the valve unit has an inlet valve and an outlet valve, that the inlet valve is realized as a 2/2-way solenoid valve and is arranged between the input and the output of the valve unit, and that the outlet valve is realized as a 2/2-way solenoid valve and is arranged between the output and the depressurizing output of the valve unit, wherein the input of the valve unit is connected to the output when the inlet valve is in the de-energized state, and is shut off when the inlet valve is in the energized state, and wherein the depressurizing output is shut off when the outlet valve is in the de-energized state, and is connected to the output when the outlet valve is in the energized state.

Alternatively, it may be provided that the valve unit is realized as a 3/2-way solenoid valve having an input, an output and a depressurizing output, wherein the input of the valve unit is connected to the output when this solenoid valve is in the de-energized state, and is shut off in the energized state, and wherein the depressurizing output is shut off when this solenoid valve is in the de-energized state, and is connected to the output in the energized state.

Owing to the similarity of function, it is preferably provided that the valve unit is structurally similar to an ABS valve unit that is arranged in at least one wheel-brake line of a vehicle axle. An ABS valve unit is a valve unit via which the function of a long-known anti-lock braking system of the vehicle can be controlled. Due to the greater number of common parts used, this avoids unnecessary development costs and saves production and logistics costs.

BRIEF DESCRIPTION OF DRAWINGS

The disclosure will now be described with reference to the drawings wherein.

DETAILED DESCRIPTION

Figure 4:
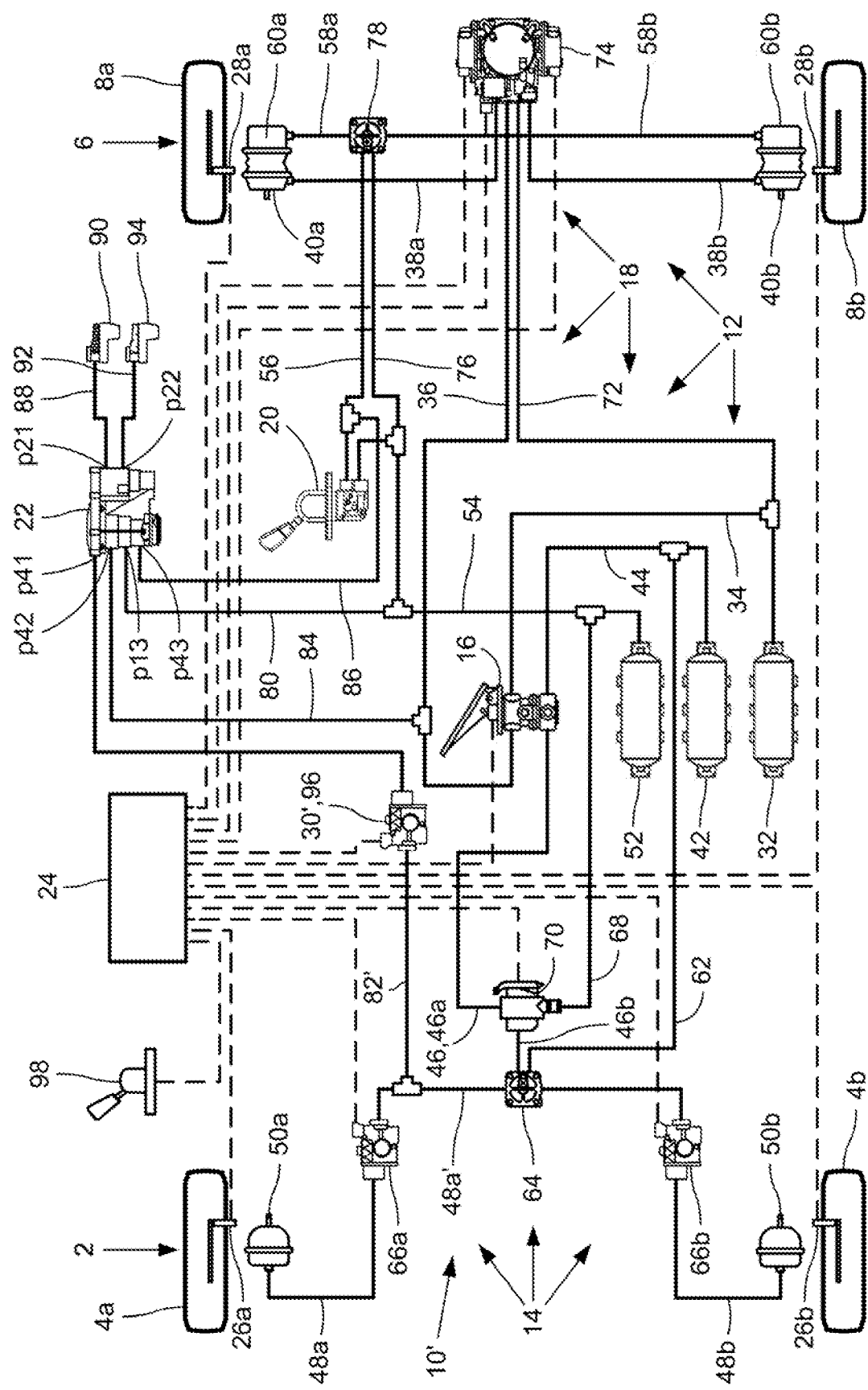

Accordingly, illustrated in FIG. 4 is a compressed-air braking system 10' of a tractor vehicle having a known valve device 30', used hitherto by the applicant, for braking a coupled trailer vehicle independently of the foot-brake valve. The tractor vehicle is configured, for example, with two axles and has a front axle 2 with front wheels 4a, 4b arranged on both sides, and a rear axle 6 with rear wheels 8a, 8b arranged on both sides.

The compressed-air braking system 10' includes two service-brake circuits 12, 14, to which a common foot-brake valve 16 is assigned, a parking-brake circuit 18, to which a parking-brake valve 20 is assigned, a trailer control valve 22, the valve device 30', an electronic brake control device 24, and four rotational-speed sensors 26a, 26b; 28a, 28b that are arranged on the wheels 4a, 4b; 8a, 8b of the two vehicle axles 2, 6 and are connected to the brake control device 24 via electrical sensor lines. To avoid using a confusingly large number of reference designations, the electrical sensor lines of the rotational-speed sensors 26a, 26b; 28a, 28b, as well as further electrical sensor lines and control lines, each represented by dashed lines, are not denoted by reference designations in FIG. 4.

The first service-brake circuit 12 includes a first compressed-air accumulator 32, in which, as an example in this case, the stored compressed air is under a pressure of $13 \times 10^5$ Pa, a first supply line 34 that is routed from this compressed-air accumulator 32 to the foot-brake valve 16, as well as a first axle-brake line 36 that is routed from the foot-brake valve 16 to two wheel-brake lines 38a, 38b and wheel-brake cylinders 40a, 40b of the rear axle 6 that are connected to these.

The second service-brake circuit 14 includes a second compressed-air accumulator 42, in which the stored compressed air in this case is likewise under a pressure of $13 \times 10^5$ Pa, a second supply line 44 that is routed from this compressed-air accumulator 42 to the foot-brake valve 16, as well as a second axle-brake line 46 that is routed from the foot-brake valve 16 to front wheel-brake lines 48a, 48b and wheel-brake cylinders 50a, 50b of the front axle 2 that are connected to these.

The parking-brake circuit 18 includes a third compressed-air accumulator 52, in which, as an example in this case, the stored compressed air is under a pressure of $8.5 \times 10^5$ Pa, a third supply line 54 that is routed from this compressed-air accumulator 52 to the parking-brake valve 20, as well as an axle-brake line 56 that is routed from the parking-brake valve 20 to wheel-brake lines 58a, 58b and spring-brake cylinders 60a, 60b of the rear axle 6 that are connected to these. The wheel-brake cylinders 40a, 40b of the first service-brake circuit 12, which are preferably realized as diaphragm brake cylinders, and the spring-brake cylinders 60a, 60b of the parking-brake circuit 18 are in this case each combined as combination brake cylinders and act on the same wheel brakes on the wheels 8a, 8b of the rear axle 6.

Instead of being branched directly into the front wheel-brake lines 48a, 48b, the axle-brake line 46 of the second service-brake circuit 14 is connected to the control input of a pressure-controlled first relay valve 64, routed to which there is also a fourth supply line 62 that branches off from the second supply line 44 assigned to the second compressed-air accumulator 42. In the first relay valve 64, the air pressure applied to its control input is converted by air volume boosting into a brake pressure that is directed into the connected wheel-brake lines 48a, 48b of the front axle 2. Arranged in each of the wheel-brake lines 48a, 48b of the front axle 2 there is a respective ABS valve unit 66a, 66b, each of which is connected to the control device 24 via a respective electrical control line. Via the two ABS valve units 66a, 66b, the respective brake pressure is lowered if the evaluation of the rotational-speed signals of the speed sensors 26a, 26b, 28a, 28b in the control device 24 detects a locking or a locking tendency of one of the wheels 4a, 4b of the front axle 2.

Additionally arranged in the axle-brake line 46 of the second service-brake circuit 14 is a switchover valve 70 that is realized as a 3/2-way solenoid valve and connected to the control device 24 via an electrical control line. The portion 46a of the axle-brake line 46 on the foot-brake valve side is connected to a first input of the switchover valve 70. Connected to a second input of the switchover valve 70 there is a fourth supply line 68 that branches off from the supply line 54 connected to the compressed-air accumulator 52 of the parking-brake circuit 18. The portion 46b of the axle-brake line 46 on the relay-valve side is connected to the control input of the first relay valve 64.

When the switchover valve 70 is in the de-energized state, its first input is connected to the output of the switchover valve 70 and the second input is shut off, such that the brake pressure introduced, via the foot-brake valve 16, into the portion 46a of the axle-brake line 46 on the foot-brake valve side is then applied, via the portion 46b of the axle-brake line 46 on the relay-valve side, to the control input of the relay valve 64, and a corresponding brake pressure is introduced into the wheel-brake lines 48a, 48b of the front axle 2.

When the switchover valve 70 is in an energized and thus switched-over state, its second input is connected to the output of the switchover valve 70 and the first input of the switchover valve 70 is shut off. As a result, the supply pressure of the compressed-air accumulator 52 of the parking-brake circuit 18 is applied, at $8.5 \times 10^5$ Pa, to the control input of the relay valve 64, and a corresponding brake pressure is then introduced into the wheel-brake lines 48a, 48b of the front axle 2.

As a result of the described switching-over of the switchover valve 70, the wheels 4a, 4b of the front axle 2 can thus be braked independently of an actuation of the foot-brake valve 16, and this can be used, for example, in conjunction with a distance assistance system for emergency braking of the tractor vehicle, to avoid a rear-end collision.

Similarly, instead of being branched directly into the wheel-brake lines 38a, 38b, the axle-brake line 36 of the first service-brake circuit 12 for the wheels of the rear axle 6 is connected to the control input of a pressure-controlled relay valve, to which a fifth supply line 72 is routed, branching off from the supply line 34 of the assigned first compressed-air accumulator 32. In contrast to the arrangement for the front axle 2, however, the relay valve for the rear axle 6 is arranged in an axle-valve module 74. In the relay valve, the air pressure applied to the control input is converted by air volume boosting into a brake pressure that is directed into the connected wheel-brake lines 38a, 38b for the brakes of the rear axle 6. Also arranged in each of these wheel-brake lines 38a, 38b for the rear axle brakes there is a respective ABS valve unit that is likewise arranged in the axle-valve module 74 and is connected to the control device 24 via a respective electrical control line. Via the ABS valve units of the axle-valve module 70, which are not denoted separately, the respective brake pressure is lowered if the evaluation of the rotational-speed signals of the speed sensors 26a, 26b, 28a, 28b in the control unit 24 detects a locking or a locking tendency of one of the wheels 8a, 8b of the rear axle 6.

The axle-valve module 70 of the first service-brake circuit 12 also includes a switchover valve, not separately identified, that is realized as a 3/2-way solenoid valve and is connected to the control device 24 via an electrical control line. The first axle-brake line 36 is connected to a first input of this switchover valve. The fifth supply line 72, branching off from the supply line 34 of the assigned first compressed-air accumulator 32, is connected to a second input of the switchover valve. The output of the switchover valve is connected to the control input of the relay valve.

When the switchover valve is in the de-energized state, its first input is connected to the output of the switchover valve and the second input of the switchover valve is shut off, such that the brake pressure introduced, via the foot-brake valve, into the axle-brake line 36 is applied to the control input of the relay valve, and a corresponding brake pressure is introduced into the wheel-brake lines 38a, 38b of the rear axle 6.

When the switchover valve is in an energized, and thus switched-over, state, the second input of the switchover valve is connected to the output of the switchover valve and the first input of the switchover valve is shut off, such that the supply pressure of the compressed-air accumulator 32 of the first service-brake circuit 12 is then applied, at $13 \times 10^5$ Pa, to the control input of the relay valve, and a corresponding brake pressure is introduced into the wheel-brake lines 38a, 38b of the rear axle 6. As a result of the switching-over of the switchover valve, the wheels 8a, 8b of the rear axle 6 can thus also be braked independently of an actuation of the foot-brake valve 16.

Instead of being branched directly into the rear wheel-brake lines 58a, 58b, the axle-brake line 56 of the parking-brake circuit 18 is connected to the control input of a pressure-controlled second relay valve 78, routed to which there is also a sixth supply line 76 that branches off from the third supply line 54 assigned to the third compressed-air accumulator 52. In the second relay valve 78, the air pressure applied to its control input is converted by air volume boosting into a brake release pressure that is directed into the connected wheel-brake lines 58a, 58b and the spring-brake cylinders 60a, 60b, connected thereto, of the rear axle 6.

The trailer control valve 22 has a supply input p13, two direct control inputs p41, p42, an inverted control input p43, a supply output p21, a brake control output p22 and a depressurizing output p3. Connected to the supply input p13 of the trailer control valve 22 there is seventh supply line 80 that branches off from the supply line 54 connected to the third compressed-air accumulator 52 of the parking-brake circuit 18. Connected to the first direct control input p41 there is a brake control line 82' that branches off from the inner portion 48a' of the wheel-brake line 48a that is located between the first relay valve 64 and the ABS valve unit 66a of the right wheel-brake line 48a of the front axle 2. Connected to the second direct control input p42 there is a brake control line 84 that branches off from the axle-brake line 36 of the first service-brake circuit 12 for the brakes of the rear axle 6. Connected to the inverted control input p43 there is a brake control line 86 that branches off from the axle-brake line 56 of the parking-brake circuit 18 for the brakes of the rear axle 6.

An eighth supply line 88 is routed from the supply output p21 of the trailer control valve 22 to a "supply" gladhand coupler (red) 90. A brake control line 92 is routed from the brake control output p22 of the trailer control valve 22 to a "brake" (yellow) gladhand coupler 94. In the trailer control valve 22, a brake control pressure is produced in dependence on the brake control pressures or brake pressures applied to the direct control inputs p41, p42 and in dependence on the brake control pressure or brake release pressure applied to the inverted control input p43, which brake control pressure is directed, via the brake control output p22 and the brake control line 92, to the "brake" gladhand coupler (yellow) 94 and is converted in a coupled trailer vehicle, in the trailer brake valve there, into a brake pressure for the wheel brakes there.

The valve device 30', for braking a coupled trailer vehicle independently of the foot brake valve, has an electronically controllable valve unit 96 that is arranged in the brake control line 82' leading to the first direct control input p41 of the trailer control valve 22. This valve unit 96 has an input, an output and a depressurizing output. The portion of the brake control line 82' on the brake-line side is connected to the input, and the portion of the brake control line 82' on the trailer control-valve side is connected to the output. In addition, this valve unit 96 is connected to the control device 24 via an electrical control line. For the purpose of actuating the valve unit 96, assigned to the valve device 30' there is an electrical operator control unit 98 that is arranged in the driver's cabin of the tractor vehicle and connected to the control device 24 via an electrical control line.

When the valve unit 96 of the valve device 30' is in the non-actuated state, that is, not switched over, its input is connected to its output and the depressurizing output is shut off, such that the brake pressure applied in the right-hand wheel-brake line 48a of the front axle 2 is also applied, as brake control pressure, to the first direct control input p41 of the trailer control valve 22. When the valve unit 96 has been switched over, its input is shut off and its output is connected to the depressurizing output, such that the direct control input p41 of the trailer control valve 22 is then depressurized.

In order to effect braking of a coupled trailer vehicle independently of an actuation of the foot-brake valve, in particular to effect anti-jackknife braking, while the vehicle combination is moving, with the wheel brakes released, that is, wheel-brake cylinders 40a, 40b; 50a, 50b depressurized and spring-brake cylinders 60a, 60b carrying pressure, it is necessary, in the case of this known valve device 30', for the switchover valve 70 of the second service-brake circuit 14 to be switched over, and for the ABS valve units 66a, 66b of the front axle 2 to be switched over to their depressurizing position.

With the switching-over of the switchover valve 70, the supply pressure from the third compressed-air accumulator 52 of the parking-brake circuit 18 is switched to the control input of the first relay valve 64, such that a corresponding brake pressure is introduced into the wheel-brake lines 48a, 48b of the front axle 2 in the latter. With the switching-over of the ABS valve units 66a, 66b to their depressurizing position, the wheel-brake cylinders 50a, 50b of the front axle 2 are kept without pressure, so that the wheels 4a, 4b of the front axle 2 are not braked. The braking, or anti-jackknife braking, of the trailer vehicle via the switching-over of the valve unit 96 of the valve device 30' may then be effected permanently or in pulsed mode by repeated switching-over.

A disadvantage of this arrangement, in particular of the brake control line 82' and the valve unit 96 of the valve device 30', is the high degree of control complexity involved in the switching-over of the switchover valve 70, the two ABS valve units 66a, 66b and the valve unit 96. It is also disadvantageous that the wheels 4a, 4b of the front axle 2 are not braked when, for example, the driver actuates the foot-brake valve 16 during anti-jackknife braking of the trailer vehicle. An actuation of the foot-brake valve 16 is indeed sensed by a sensor or brake-light switch arranged in this valve, and transmitted to the control device 24 via an electrical sensor line. However, a switching-over of the switchover valve 70, the ABS valve units 66a, 66b and the valve unit 96 triggered by this results in an adverse delayed response of the wheel brakes on the front axle 2.

Figure 1:
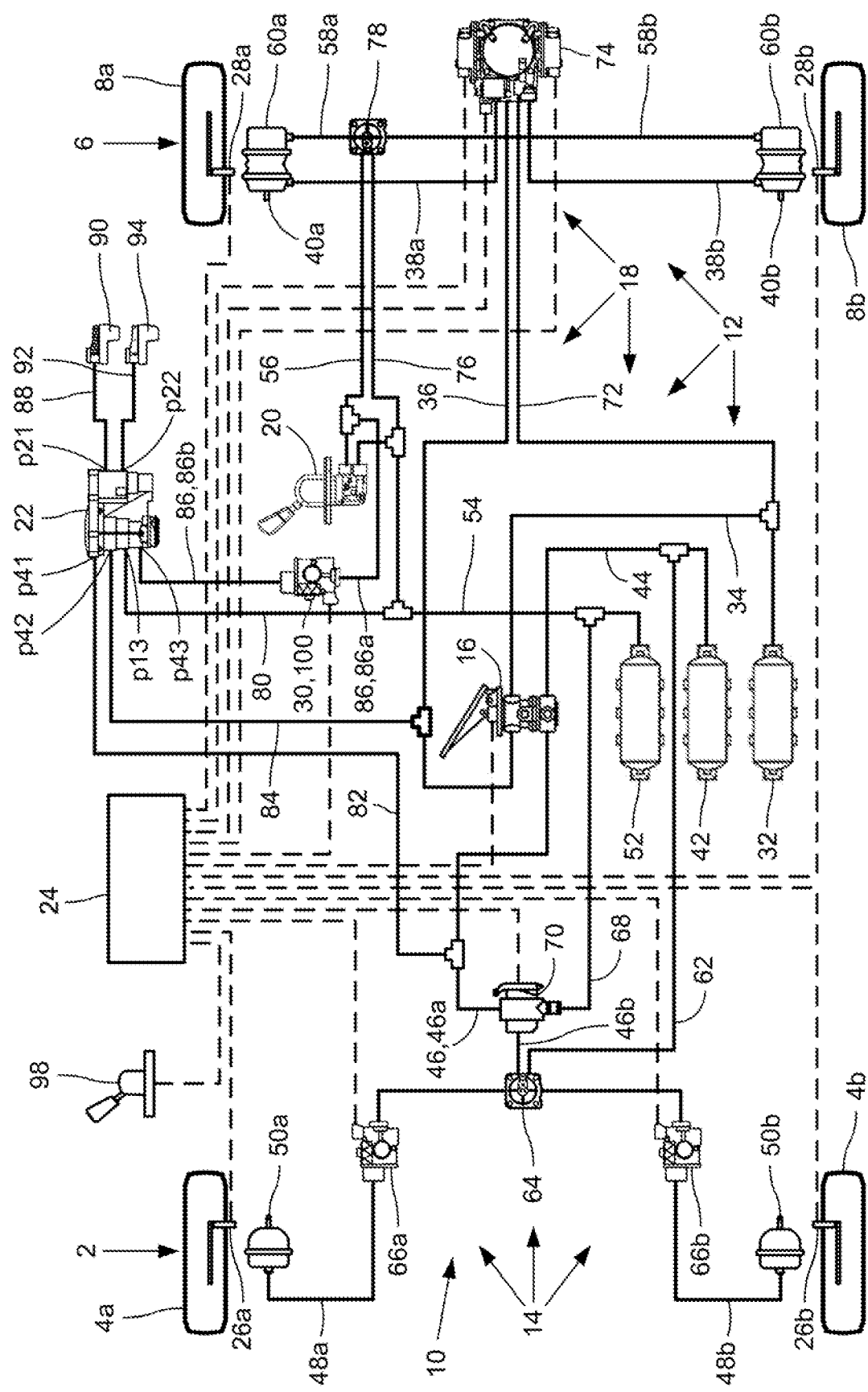
FIG. 1 shows a schematic overview representation of a compressed-air braking system of a tractor vehicle having a valve device according to the disclosure.

Illustrated in FIG. 1 is a compressed-air braking system 10 of a tractor vehicle having a valve device 30 according to the disclosure for braking a coupled trailer vehicle independently of the foot brake valve, by which the disadvantages just mentioned are avoided.

With an otherwise largely identical structure of the compressed-air braking system 10 as compared with the compressed-air braking system 10' according to FIG. 4, the brake control line 82 connected to the first direct control input p41 of the trailer control valve 22 is now connected to the axle-brake line 46 of the second service-brake circuit 14, or of the front axle 2. In addition, the valve device 30 according to the disclosure for braking a coupled trailer vehicle independently of the foot brake valve has an electronically controllable valve unit 100, 100' that is now arranged in the brake control line 86 leading to the inverted control input p43 of the trailer control valve 22. This valve unit 100, 100' has an input 102, an output 104 and a depressurizing output 106. The portion 86a of the brake control line 86 on the parking-brake valve side is connected to the input 102, and the portion 86b of the brake control line 86 on the trailer control-valve side is connected to the output 104. In addition, this valve unit 100, 100' is connected to the control device 24 via an electrical control line. The actuation of this valve unit 100, 100' is effected as previously described via the electrical operator control unit 98 that is arranged in the driver's cabin of the tractor vehicle and is connected to the control device 24 via an electrical control line.

Figure 2:
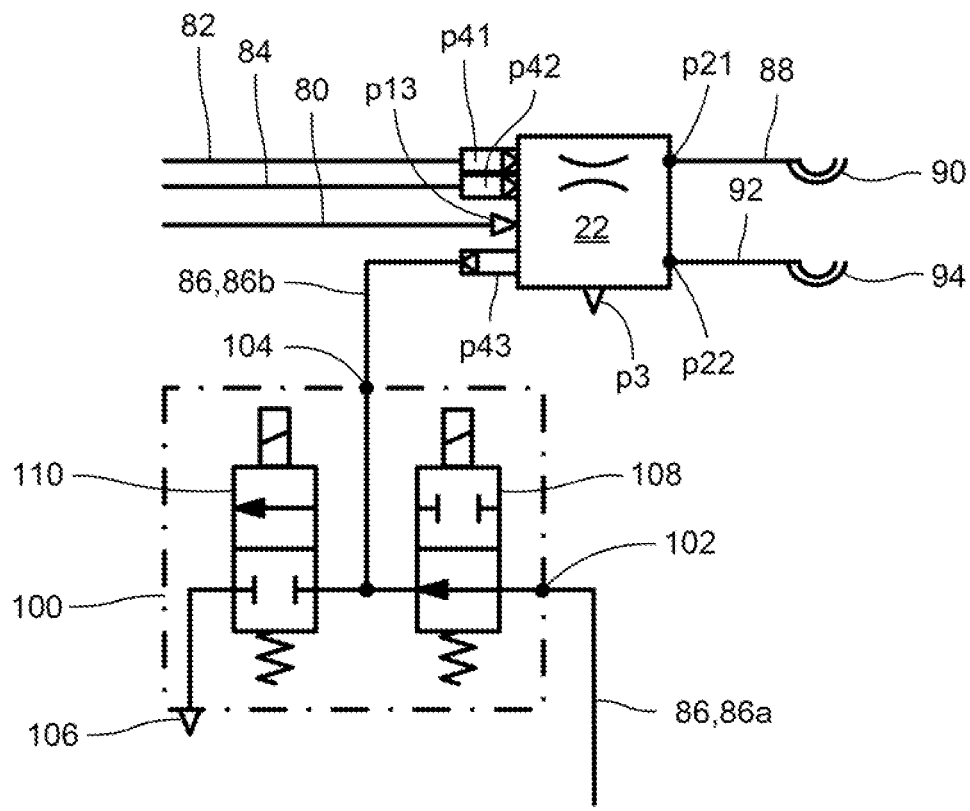
FIG. 2 shows a first embodiment of the valve device according to the disclosure, in a schematic partial view of the compressed-air braking system.

In a first embodiment represented schematically in FIG. 2, the valve unit 100 includes an inlet valve 108 and an outlet valve 110. The inlet valve 108 is realized as a 2/2-way solenoid valve, and is arranged between the input 102 and the output 104 of the valve unit 100. The outlet valve 110 is likewise realized as a 2/2-way solenoid valve, and is arranged between the outlet 104 and the depressurizing output 106 of the valve unit 100. When the inlet valve 108 is in the de-energized state, the input 102 is connected to the output 104, and is shut off when the inlet valve 108 is in the energized state. The depressurizing output 106 of the valve unit 100 is shut off when the outlet valve 110 is in the de-energized state, and is connected to the output 104 when the outlet valve is in the energized state.

Figure 3:
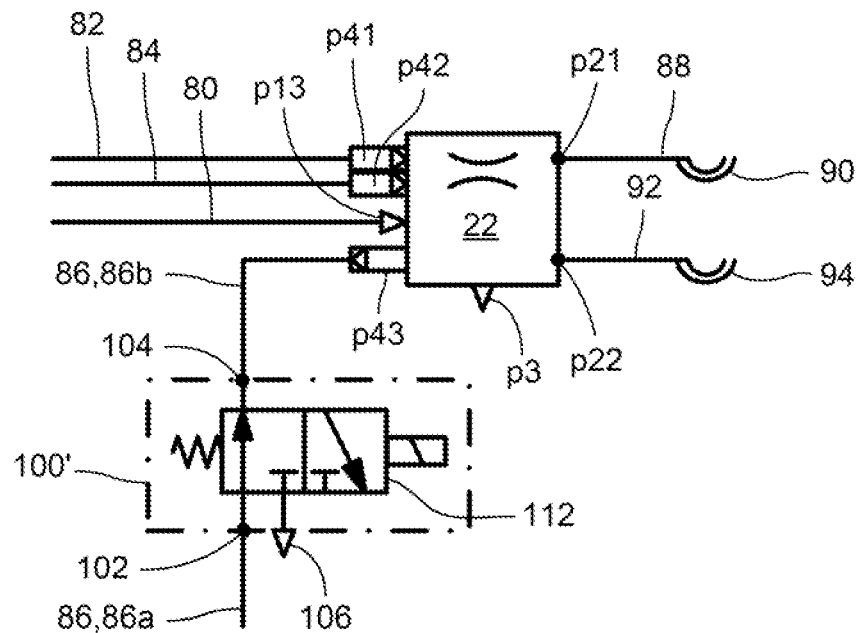
FIG. 3 shows a second embodiment of the valve device according to the disclosure, in a schematic partial view of the compressed-air braking system; and, FIG. 4 shows a schematic overview of a compressed-air braking system of a tractor vehicle having a known valve device.

In the second embodiment illustrated schematically in FIG. 3, the valve unit 100' is realized as a 3/2-way solenoid valve 112 having an input 102, an output 104 and a depressurizing output 106. The input is connected to the output 104 when the solenoid valve 100' is in the de-energized state, and is shut off in the energized state. The depressurizing output 106 of the valve unit 100' is shut off when the solenoid valve 100' is in the de-energized state, and is connected to the output 104 in the energized state.

When the two valve units 100, 100' are in the non-actuated state, that is, not switched over, the input 102 is thus connected to the output 104, and the depressurizing output 106 is shut off, such that the brake release pressure introduced into the brake control line 86 via the parking-brake valve 20 is also applied, as brake control pressure, to the inverted control input p43 of the trailer control valve 22. When these valve units 100, 100' are in the switched-over, that is, actuated, state, their input 102 is shut off and their output 104 is connected to the depressurizing output 106, such that the inverted control input p43 of the trailer control valve 22 is then depressurized.

In order to effect braking of a coupled trailer vehicle independently of an actuation of the foot-brake valve, in particular to effect anti-jackknife braking, while the vehicle combination is moving, with the wheel brakes released, that is, wheel-brake cylinders 40a, 40b; 50a, 50b depressurized and spring-brake cylinders 60a, 60b carrying pressure, in the case of the valve device 30 according to the disclosure it is necessary only for the valve unit 100, 100' to be switched over, which may be effected permanently or in pulsed mode by repeated switching-over.

If, for example, the driver now actuates the foot-brake valve 16 during anti-jackknife braking of the trailer vehicle, the wheel-brake cylinders 40a, 40b; 50a, 50b of both vehicle axles 2, 6 are immediately supplied with the brake pressures introduced into the axle-brake lines 36, 46 via the foot-brake valve 16, and thus the trailer vehicle is braked. The braking of the trailer vehicle is then effected by the brake release pressure applied to the inverted control input p43 in the trailer control valve 22 being over-ridden by the brake pressures applied to the direct control inputs p41, p42 from the axle-brake lines 36, 46 of the two service-brake circuits 12, 14.

It is understood that the foregoing description is that of the preferred embodiments of the invention and that various changes and modifications may be made thereto without departing from the spirit and scope of the invention as defined in the appended claims.

LIST OF REFERENCE DESIGNATIONS (PART OF THE DESCRIPTION)

2 vehicle axle, front axle
4a, 4b front wheels
6 vehicle axle, rear axle
8a, 8b rear wheels
10, 10' compressed-air braking system
12 first service-brake circuit
14 second service-brake circuit
16 foot-brake valve
18 parking-brake circuit
20 parking-brake valve
22 trailer control valve
24 electronic brake control device
26a, 26b rotational-speed sensors
28a, 28b rotational-speed sensors
30, 30' valve device
32 first compressed-air accumulator
34 first supply line
36 first axle-brake line
38a, 38b rear wheel-brake lines
40a, 40b rear wheel-brake cylinder
42 second compressed-air accumulator
44 second supply line
46 second axle-brake line
46a portion of the second axle-brake line 46 on the foot-brake valve side
46b portion of the second axle-brake line 46 on the relay valve side
48a, 48b front wheel-brake lines
48a' inner portion of 48a
50a, 50b front wheel-brake cylinder
52 third compressed-air accumulator
54 third supply line
56 third axle-brake line
58a, 58b wheel-brake lines
60a, 60b spring-brake cylinder
62 supply line
64 first relay valve
66a, 66b ABS valve units
68 fourth supply line
70 switchover valve, 3/2-way solenoid valve
72 fifth supply line
74 axle-valve module
76 sixth supply line
78 second relay valve
80 seventh supply line
82, 82' brake control line
84 brake control line
86 brake control line
86a portion of 86 on parking-brake valve side
86b portion of 86 on trailer control-valve side
88 eighth supply line
90 "supply" gladhand coupler (red)
92 brake control line
94 "brake" gladhand coupler (yellow)
96 valve unit (prior art)
98 operator control unit
100, 100' valve unit
102 input of 100, 100'
104 output of 100, 100'
106 depressurizing output of 100, 100'
108 inlet valve, 2/2-way solenoid valve 110 outlet valve, 2/2-way solenoid valve
112 solenoid valve, 3/2-way solenoid valve
p3 depressurizing output of the trailer control valve 22
p13 supply input of the trailer control valve 22
p21 supply output of the trailer control valve 22
p22 brake control output of the trailer control valve 22
p41 first direct control input of the trailer control valve 22
p42 second direct control input of the trailer control valve 22
p43 inverted control input of the trailer control valve 22

The invention claimed is:

1. A compressed-air braking system of a tractor vehicle having a plurality of vehicle axles, the compressed-air braking system comprising:
   two service-brake circuits each having a compressed-air accumulator, a supply line routed from the compressed-air accumulator to a foot-brake valve, and an axle-brake line routed from said foot-brake valve to wheel-brake lines and wheel-brake cylinders of corresponding ones of the plurality of vehicle axles connected to said wheel-brake lines; a parking-brake circuit having a third compressed-air accumulator, a supply line routed from said third compressed-air accumulator to a parking-brake valve, and an axle-brake line leading from said parking-brake valve to further wheel-brake lines and spring-brake cylinders of a corresponding one of the plurality of vehicle axles that are connected to said further wheel-brake lines;
   a trailer control valve having at least one direct control input and an inverted control input;
   a brake control line connected to said axle-brake line of one of said two service-brake circuits being connected to said at least one direct control input;
   a further brake control line connected to said axle-brake line of said parking-brake circuit being connected to said inverted control input;
   a valve device for controlling braking of a coupled trailer vehicle independently of the foot-brake valve;
   said valve device having an electronically controllable valve unit;
   said electronically controllable valve unit being arranged in said further brake control line connected to said inverted control input of said trailer control valve;
   said valve unit having a valve-unit input, wherein a first portion of said further brake control line on a parking-brake valve side is connected to said valve-unit input;
   said valve unit having a valve-unit output, wherein a second portion of said further brake control line on a trailer control-valve side is connected to said valve-unit output;
   said valve unit having a depressurizing output; and,
   said second portion of said further brake control line on the trailer control-valve side can be connected, via said valve unit, alternately to said first portion on the parking-brake valve side or to said depressurizing output.

2. The compressed-air braking system of claim 1, wherein said valve unit has an inlet valve and an outlet valve; said inlet valve is a 2/2-way solenoid valve and is arranged between said valve-unit input and said valve-unit output; said outlet valve is a 2/2-way solenoid valve and is arranged between said output and said depressurizing output; said valve-unit input is connected to said valve-unit output when said inlet valve is in a de-energized state and is shut off when said inlet valve is in an energized state; and, said depressurizing output is shut off when said outlet valve is in said de-energized state, and is connected to said valve-unit output when said outlet valve is in said energized state.

3. The compressed-air braking system of claim 1, wherein said valve unit is a 3/2-way solenoid valve including said valve-unit input, said valve-unit output, and said depressurizing output; said valve-unit input is connected to said valve-unit output when said 3/2 solenoid valve is in said de-energized state, and is shut off in said energized state; and, said depressurizing output is shut off when said 3/2 solenoid valve is in said de-energized state, and is connected to said valve-unit output in said energized state.

4. The compressed-air braking system of claim 1, wherein said valve unit is structurally equivalent to an ABS valve unit arranged in at least one wheel-brake line of one of the plurality of vehicle axles.

* * * * *